United States Patent
Pringle et al.

(10) Patent No.: US 10,638,180 B1
(45) Date of Patent: Apr. 28, 2020

(54) MEDIA TIMELINE MANAGEMENT

(71) Applicant: Amazon Technologies, Inc., Seattle, WA (US)

(72) Inventors: Christopher Steven Mark Pringle, Chesterton (GB); Mairo Pedrini, Seattle, WA (US); Yongjun Wu, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/041,446

(22) Filed: Jul. 20, 2018

(51) Int. Cl.
  *H04N 21/262* (2011.01)
  *H04N 21/43* (2011.01)
  *H04N 21/458* (2011.01)
  *H04N 21/234* (2011.01)

(52) U.S. Cl.
  CPC ..... *H04N 21/262* (2013.01); *H04N 21/23424* (2013.01); *H04N 21/4302* (2013.01); *H04N 21/458* (2013.01)

(58) Field of Classification Search
  CPC ........... H04N 21/262; H04N 21/23424; H04N 21/4302; H04N 21/458
  See application file for complete search history.

(56) References Cited

U.S. PATENT DOCUMENTS

| | | |
|---|---|---|
| 6,330,286 B1 | 12/2001 | Lyons et al. |
| 9,426,543 B1 | 8/2016 | Li et al. |
| 2008/0267222 A1 | 10/2008 | Leung et al. |
| 2011/0096828 A1* | 4/2011 | Chen ................ H04N 21/23106 375/240.02 |
| 2011/0208722 A1* | 8/2011 | Hannuksela ......... G11B 27/034 707/723 |
| 2012/0197966 A1* | 8/2012 | Wolf ................ H04N 21/23424 709/203 |
| 2013/0091521 A1* | 4/2013 | Phillips ............ H04N 21/23424 725/35 |
| 2014/0245346 A1 | 8/2014 | Cheng et al. |
| 2015/0071606 A1* | 3/2015 | Wintzell ................ G09G 5/005 386/241 |
| 2016/0316233 A1 | 10/2016 | Ghadi et al. |
| 2018/0081618 A1* | 3/2018 | McLean .................. G06F 3/165 |
| 2019/0068665 A1 | 2/2019 | Kieft et al. |
| 2019/0208274 A1* | 7/2019 | Grouf .................... H04N 5/445 |

OTHER PUBLICATIONS

U.S. Appl. No. 15/799,143, filed Oct. 31, 2017, Wu et al.
PCT International Search Report and Written Opinion, dated Dec. 14, 2018, issued in PCT/US2018/049686.
U.S. Office Action dated Sep. 30, 2019 issued in U.S. Appl. No. 15/799,143.

* cited by examiner

Primary Examiner — Pinkal R Chokshi
(74) Attorney, Agent, or Firm — Weaver Austin Villeneuve & Sampson LLP

(57) ABSTRACT

Techniques are described for handling temporal overlaps that occur between fragments of streaming media content, such as between a fragment of primary media content (e.g., a live sporting event) and a fragment of secondary media content (e.g., ad media content) dynamically inserted into the stream.

19 Claims, 4 Drawing Sheets

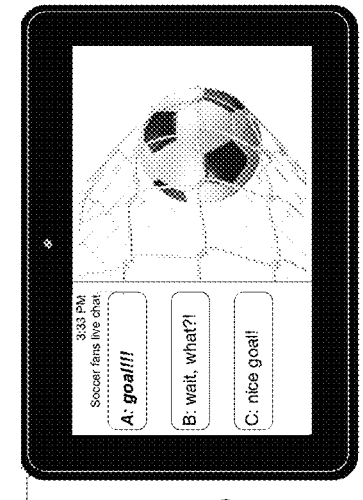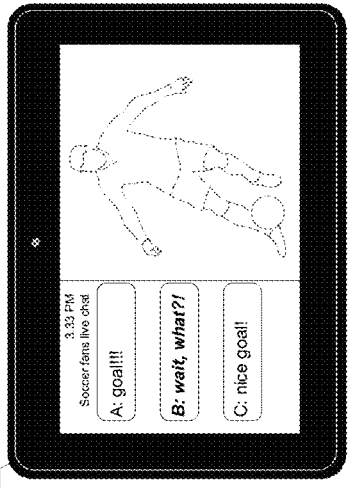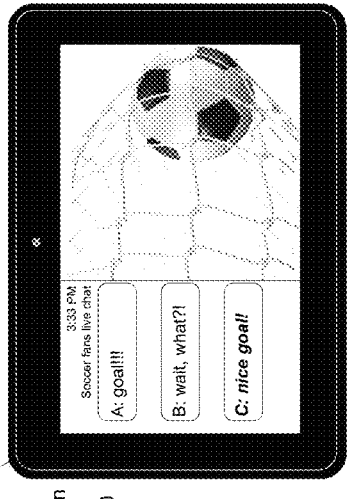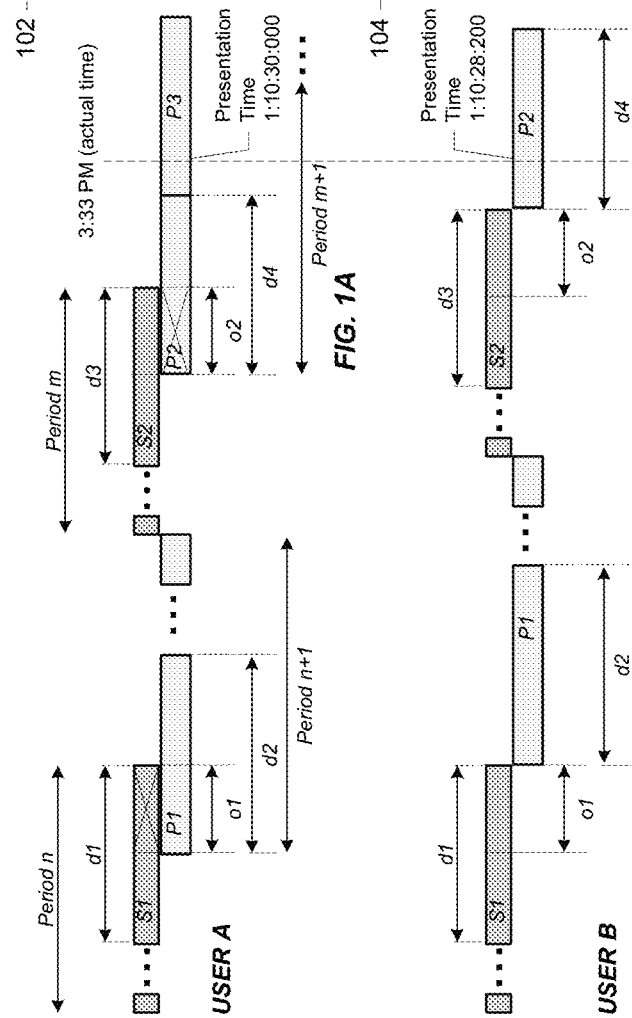
FIG. 1A
FIG. 1B
FIG. 1C

MEDIA TIMELINE MANAGEMENT

BACKGROUND

Consumers have an ever-increasing array of options for consuming media content, in terms of the types of media content (e.g., video, audio, etc.), providers of the media content, and devices for consuming the media content. Media content providers are becoming increasingly sophisticated and effective at providing media content quickly and reliably to consumers.

Many client devices that consume online content employ an adaptive bitrate streaming technique to request successive fragments of the content for decoding, rendering, and display. Manifest data are provided to the client to provide the client with the information it needs to generate properly formatted requests for the audio, video, and subtitle fragments of the live streaming content. The manifest data typically includes multiple options for video and audio streams, each including video and audio fragment at different resolutions, quality levels, bitrates, languages, etc. The manifest data also includes presentation time data, such as timestamps, for presenting the fragments according to a media timeline. In some scenarios, the presentation time data may indicate that two fragments for a particular playback option (e.g., two adjacent video fragments for a particular resolution, quality, bit rate and resolution) overlap in time.

For example, live streaming content includes primary content such as scheduled content (e.g., premium movie channels) or live broadcasts (e.g., live sporting events, live concerts, etc.). Live streaming content often includes segments of secondary content (e.g., advertisements) that are dynamically inserted within the primary content. The secondary content is typically inserted in the place of so-called slates that are inserted (often manually and in real time) as placeholders in the primary content. For example, a slate might be inserted at the source of the live content (e.g., at a football stadium video capture booth) by an operator pushing a button when the slate should begin and releasing or pressing the button again when the slate should end based on what is happening in real time at the event being broadcast (e.g., during a timeout on the field). Given the arbitrary nature of slate insertion, and that secondary content (e.g., ads) inserted in such slate periods originates from other sources (e.g., an ad exchange), the inserted secondary content may be longer than the slate it replaces.

For instance, presentation time data in manifest data may indicate a temporal overlap of 0.2 seconds corresponding to the scenario where fragments for secondary content with a duration of 15.2 seconds are being inserted for a slate with a duration of 15 seconds. In some devices, the manifest data can be used to play back the streaming content by either truncating playback of the last fragment of secondary content by 0.2 seconds, or by skipping the first 0.2 seconds of the first fragment of the resumed primary content (i.e., offsetting the start of playback of a fragment by skipping an initial portion of the fragment). However, certain devices do not support fragment playback involving truncation or offset starts because of limitations in rendering hardware and/or firmware. If the device is not equipped to handle these overlaps at the transitions between primary and secondary content, playback may be degraded, such as the synchronization between audio and video being lost, or other undefined behavior including silence, black frames, and/or corrupted frames. The degradation may become amplified over time as the effects of such overlaps accumulate.

Some devices that lack the ability to decode-and-drop (i.e., to drop frames that have been decoded but will not be displayed) can truncate playback of the end of a fragment by flushing the renderer stack. However, in addition to not addressing the inability to perform offset starts, (i.e., skip the beginning portion of a fragment) this is not the optimal solution because it can increase the chance of re-buffers as the renderer stacks are replenished. It also causes the media player to drift away from the live playhead of the primary content because of the additional time it takes to fill the renderer buffer after a flush, which may cause a visible black period and/or spinner indicating a pause in media content playback. If the playback of the media player, i.e., the client playhead, lags too far behind the live playhead, this can result in a negative viewer experience. Another approach avoids the need to handle such discontinuities by using two media players; one to handle playback of the primary content, and one to handle playback of the secondary content, and switching between the two players. However, running two media players can be wasteful of processing resources and may be characterized by unacceptable latencies when switching between the two players. Furthermore, certain devices only have hardware for one video decoder pipeline, therefore implementations requiring two media players are not an option for such devices.

In older or lower cost devices that do not support truncating fragment playback, such as by dropping a portion of the audio or video fragment, the effect of such overlaps can be degraded playback in the form of buffer flushing, loss of audio/video synchronization, and/or excessive increases in the playhead latency (e.g., the delay between the live playhead of the video content and a client playhead associated with the playback of the video content on a client device).

BRIEF DESCRIPTION OF THE DRAWINGS

FIGS. 1A-C illustrate various examples of media timeline management for manifest data indicating temporal overlaps between certain fragments of media content.

DETAILED DESCRIPTION

Figure 2:
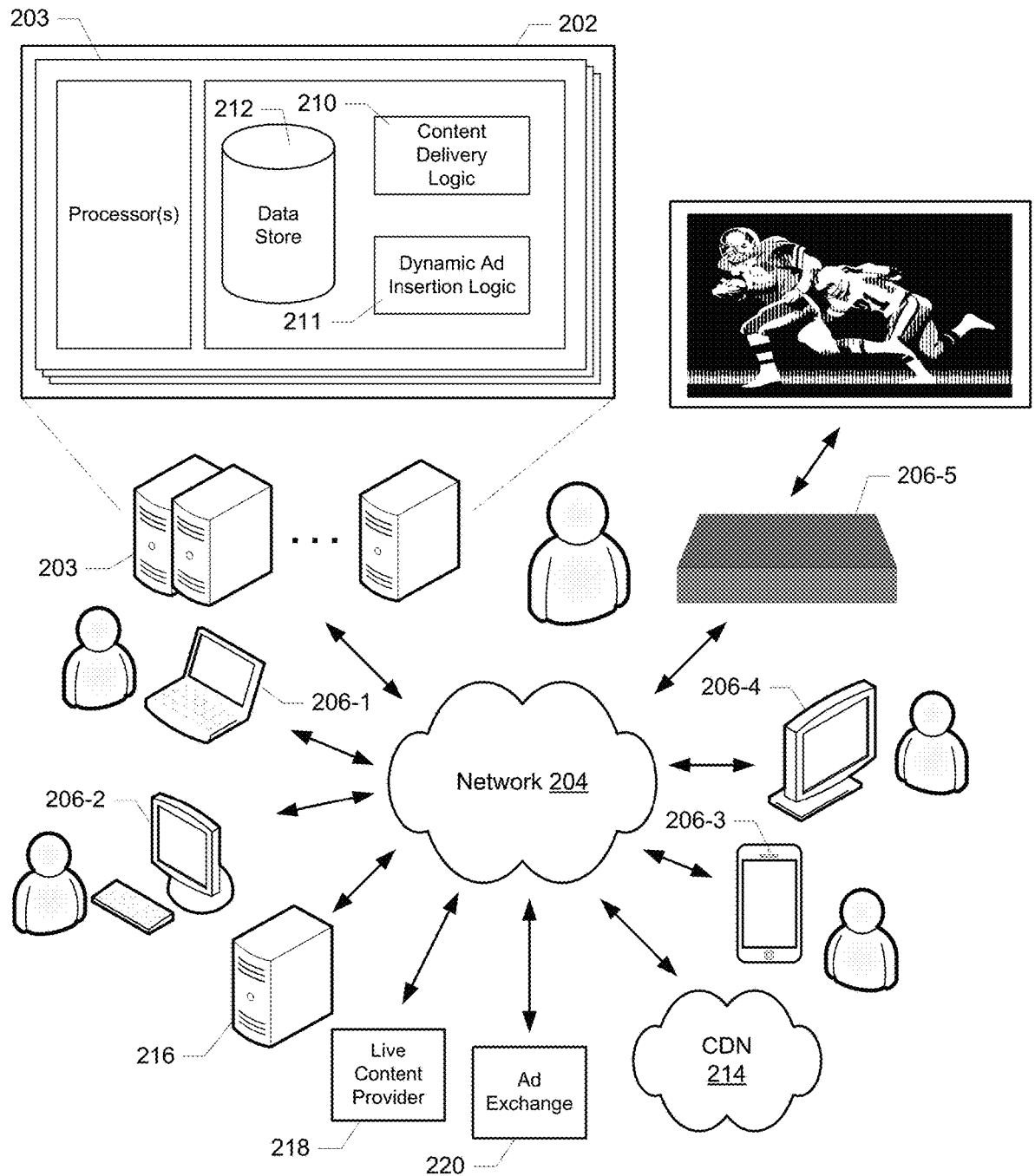
FIG. 2 illustrates an example of a computing environment in which various implementations may be practiced.

This disclosure describes techniques for handling overlaps that occur between fragments of streaming content, e.g., between a fragment of primary content (e.g., a live sporting event) and a fragment of secondary content (e.g., ad content) dynamically inserted into the stream. Devices that are not configured to support truncated fragment playback can dynamically select between different playback scenarios, such as sequentially playing the entirety of both overlapped fragments, or dropping one fragment and playing the other fragment entirely, while ensuring that the delay between the live playhead of live streaming content and the client playhead of a client consuming the live stream conforms to a constraint. By tracking a dynamic offset and applying that offset to the presentation times of each affected fragment of both the audio and video portions of the stream, deviations from a playhead latency value (e.g., ±1 second window of deviation from, for example, an initial playhead latency value of 10 seconds) are constrained. The dynamic offset is derived and updated by logic on the client device based on the presentation times of overlaps or gaps between audio or video fragments of the stream as represented in manifest data. The dynamic offset accounts for the cumulative delays caused by sequentially playing back fragments that would otherwise have been overlapped (e.g., handling by delaying subsequent fragments in the timeline) or separated by a gap (e.g., handling by pulling forward subsequent fragments in the timeline). This dynamic offset is then applied to the presentation times (also referred to herein as time stamps) associated with each subsequent audio and video fragment of the stream. Where subtitles are included with the content, the offset will also be applied to the subtitle fragments associated with the stream to maintain synchronization of the subtitle content with the audio and video. As will be discussed, the techniques enabled by the present disclosure serve to constrain variations in playhead latency without requiring the flushing of content from the renderer buffers or two separate rendering interfaces, even for devices that do not support truncated fragment playback. An example will be instructive.

The timing diagram in FIG. 1A illustrates the situation in which insertion of the secondary content (represented by fragment S1 of content period n) results in an overlap of the end of the secondary content and the beginning of the next fragment of primary content (represented by fragment P1 of period n+1). This overlap is represented in dynamic manifest data, which includes metadata for each fragment that specifies its presentation time relative to a media timeline associated with the overall media presentation. For example, there is an overlap between the end of S1 and the beginning of P1. FIG. 1A also depicts another temporal overlap between secondary content S2 and primary content P2 occurring at the transition between period m and period m+1. It should be appreciated that though not depicted in FIG. 1A, additional occurrences of overlaps, and/or occurrences of gaps (e.g., inserted secondary content is shorter than the slate duration) can also be indicated in the dynamic manifest data. It should further be appreciated that FIG. 1A does not depict modifying presentation time data, and therefore represents the original timeline.

The display on device 102 is an example of the media content that is rendered on device 102 at a particular time (e.g., 3:33 PM) according to one playback scenario using the dynamic manifest data as described above. Device 102 is a device that supports truncated fragment playback. In certain implementations, device 102 handles the transition between overlapped fragments S1 and P1 by playing back only a truncated portion of S1 and playing back the entire portion of P1. For example, for the fragment S1 having a duration d1, device 102 does not render the final time duration of o1, which corresponds to the extent of the temporal overlap between S1 and P1 (truncating the end of a fragment is depicted in FIG. 1A by the crossed out portion of fragment S1). In other words, after rendering the initial d1-o1 temporal portion of S1, device 102 begins rendering P1. Similarly, the duration d3 for fragment S2 is reduced by the amount of temporal overlap o2, and fragment P2 is rendered after the truncated playback of S2. In other implementations, device 102 handles the overlap by rendering the entire fragment S1, but only rendering the remaining d2-o1 portion of fragment P1 (truncating the beginning of a fragment is depicted in FIG. 1A by the crossed out portion of fragment P2). In either implementation, whether truncating the end of a fragment or the beginning of a fragment, the media content rendered on device 102 conforms to the media timeline indicated in the dynamic manifest data.

As illustrated in FIG. 1A, at a particular time, 3:33 PM in the example (as indicated by the vertical dashed line labeled 3:33 PM in FIGS. 1A-C), device 102 is rendering a video frame in fragment P3 which corresponds to a soccer ball hitting the back of a goal. At that time, user A, who is viewing device 102, is engaging in a live chat with user B viewing device 104 and user C viewing device 106, which are each requesting media content fragments according to dynamic manifest data indicating the same original media timeline. The timelines depicted in FIGS. 1A-C are aligned relative to an actual time (e.g., 3:33 PM on a wall clock). However, at 3:33 PM, each device is at a different time in the media presentation timeline. For example, at 3:33 PM, device 102, in accordance with the original timeline in the dynamic manifest data, is at a media presentation time of, for example, 1:10:30:000 (one hour, 10 minutes, 30 seconds, 0 ms). At the same time of 3:33 PM, device 104 is at a media presentation time of 1:10:28:200 (one hour, 10 minutes, 28 seconds, 200 ms), meaning device 104 displays content, such as fragment P2, 1.8 seconds later than device 102. Continuing the example, at the same time of 3:33 PM, device 106 is at a media presentation time of 1:10:30:200 (one hour, 10 minutes, 30 seconds, 200 ms), meaning device 106 displays content, such as fragment P3, 0.2 seconds earlier than device 102. In other words, at the actual time of 3:33 PM, each of the three devices are at a different time in the media presentation timeline, and have therefore rendered different portions of the media presentation. The differences in the portions of the media presentation that have been rendered influences interactions between the users of the three devices. As illustrated in the text chat area in FIG. 1A, A has already sent a chat message regarding a goal being scored, and A has already received chat messages from B and C regarding their reactions to a different portion of the media content being rendered on their respective devices.

Referring to the example depicted in FIG. 1B, which corresponds to user B, device 104 detects an overlap of duration of in dynamic manifest data based on the end time of fragment S1 and the start time of fragment P1. However, device 104 does not support truncated fragment playback. Instead, device 104 plays back both S1 and P1 entirely. In a class of implementations, the presentation times of fragment P1 and subsequent fragments are increased by o1, effectively moving to the right on the overall media presentation timeline as shown in FIG. 1B. For example, if o1 is 0.9 seconds, a dynamic offset value can be updated from zero to 0.9 seconds, and the timestamp for P2 can be adjusted by the value of the dynamic offset (i.e. P2 timestamp+0.9 seconds). The timestamp for S2 is similarly adjusted by 0.9 seconds to accommodate for the later end time for period n+1. For the overlap between S2 and P2, the dynamic offset value is updated again. For example, if o2 is again 0.9 seconds, fragment P2 is adjusted by 1.8 seconds (0.9+0.9) to accommodate for the 0.9 second overlap between S1 and P1, and the 0.9 second overlap between S2 and P2. Because playback on device 104 has been delayed by 1.8 seconds relative to device 102, user B at 3:33 PM is still viewing fragment P2, where the goal has not yet been scored. It should be appreciated that though not depicted in FIG. 1B, additional occurrences of overlaps and/or occurrences of gaps can also be indicated in the dynamic manifest data, such that the cumulative effect is temporally larger than the preceding example. As an example, there may have been a total of 10 gaps and 40 overlaps up until 3:33 PM, with each overlap contributing an average dynamic offset value increase of one second, and each gap contributing an average dynamic offset value reduction of one second, for a net increase of 30 seconds. In such a scenario, at 3:33 PM, device 104 would be displaying content at a 30 second delay relative to device 102.

As a result, user B is confused and frustrated in the live chat since the goal alluded to by user A has not yet been rendered. For device 104, as gaps and overlaps are encountered, corresponding durations of time are either subtracted from or added to the dynamic offset by which the time stamps of subsequent audio and video samples are adjusted. However, as will be appreciated from this example, despite synchronization between the audio and video of the media presentation being maintained without the need for flushing the renderer stacks, device 104 experiences an unacceptable increase in the playhead latency.

Referring to the third example depicted in FIG. 1C, which corresponds to user C, device 106 detects an overlap of duration o1 in dynamic manifest data. Again, device 106 does not support truncated fragment playback. However, unlike for user B, the dynamic offset value is updated based on considering multiple playback scenarios.

The first playback scenario involves playing back both S1 and P1 in its entirety. Device 106 generates a first cumulative offset value corresponding to the first playback scenario. In a class of implementations, the first cumulative offset value is equal to the absolute sum of the dynamic offset value and the amount of overlap o1. In this example, the dynamic offset value prior to updating is 0 seconds, and o1 is 0.9 seconds. In other words, the first cumulative offset value is |dynamic offset value+o1|, or in this example, |0+0.9|=0.9.

The second playback scenario involves playing back all of secondary content fragment S1 and dropping all of primary content fragment P1. Device 106 generates a second cumulative offset value corresponding to the second playback scenario. In certain implementations, the second cumulative offset value is equal to the absolute sum of the dynamic offset value and the duration of fragment P1 subtracted by the amount of overlap o1. In this example, the dynamic offset value prior to updating is 0 seconds, o1 is 0.9 seconds, and the duration of fragment P1, labeled as d2, is 2 seconds. In other words, the second cumulative offset value is |dynamic offset value+(o1−d2)|, or in this example, |0+(0.9−2)|=1.1.

The third playback scenario involves dropping all of secondary content fragment S1 and playing all of primary content fragment P1. Device 106 generates a third cumulative offset value corresponding to the third playback scenario. In some implementations, the third cumulative offset value is equal to the absolute sum of the dynamic offset value and the duration of fragment S1 subtracted by the amount of overlap o1. In this example, the dynamic offset value prior to updating is 0 seconds, of is 0.9 seconds, and the duration of fragment S1, labeled as d1, is 2 seconds. In other words, the third cumulative offset value is |dynamic offset value+(o1−d1)|, or in this example, |0+(0.9−2)|=1.1. In this example, because the fragment duration of S1 and the fragment duration of P1 are identical, namely d1=d2=2 seconds, the second and third cumulative offset values are identical at 1.1 seconds. It should be appreciated that in implementations where fragment duration is variable, the second and third cumulative offset values may not be identical. It should further be appreciated that in certain implementations where fragment duration is constant (e.g., all fragments are two seconds), determination of either the second or third cumulative offset values may be skipped.

Based on the various cumulative offset values that are determined, which in this example is the triplet of (0.9, 1.1, and 1.1), device 106 selects a particular cumulative offset value. In various implementations, device 106 selects the cumulative offset value having a minimum magnitude in the set of determined cumulative offset values. In this example, device 106 selects the first cumulative offset value, which has a value of 0.9, the smallest value in the set of cumulative offset values. The first cumulative offset value corresponds to the first playback scenario, which is the playback scenario where both fragment S1 and P2 are played in their entirety. Continuing the example, the dynamic offset value is updated from 0 to 0.9, and the presentation time data of fragments subsequent to fragment S1, which includes fragment P1, are delayed by 0.9 seconds. It should be noted that the playhead delay is increased by 0.9 seconds. The disclosed techniques also allow reducing the playhead delay. The following example will be instructive.

Referring again to FIG. 1C, device 106 also detects an overlap of duration o2 in dynamic manifest data. Again, the dynamic offset value is updated based on considering multiple playback scenarios.

The first playback scenario involves playing back both S2 and P2 in their entirety, which contributes to an increase in the playhead latency. In a class of implementations, device 106 generates a first cumulative offset value corresponding to the first playback scenario that is equal to the absolute sum of the dynamic offset value and the amount of overlap o2. In this example, the dynamic offset value prior to updating is 0.9 seconds, and o2 is 0.9 seconds. In other words, the first cumulative offset value is |dynamic offset value+o2|, or in this example, |0.9+0.9|=1.8.

The second playback scenario involves playing back all of secondary content fragment S2 and dropping all of primary content fragment P2, which contributes to a reduction in the playhead latency. In certain implementations, device 106 generates a second cumulative offset value equal to the absolute sum of the dynamic offset value and the duration of fragment P2 subtracted by the amount of overlap o2. In this example, the dynamic offset value prior to updating is 0.9 seconds, o2 is 0.9 seconds, and the duration of fragment P2, labeled as d4, is 2 seconds. In other words, the second cumulative offset value is |dynamic offset value+(o2−d4)|, or in this example, |0.9+(0.9−2)|=0.2.

The third playback scenario involves dropping all of secondary content fragment S2 and playing all of primary content fragment P2. Because in this example, the fragment durations are identical, the third cumulative offset value is the same as the second cumulative offset value, and for clarity purposes, derivation details will not be repeated.

Based on the various cumulative offset values that are determined, which in this example is the triplet of (1.8, 0.2, and 0.2), device 106 selects a particular cumulative offset value. It should be appreciated that there may be multiple constraints for selecting a particular cumulative offset value. For example, in addition to having a minimum magnitude, service level agreements with advertisers may result in always selecting playback of an entire fragment of secondary content (e.g., S2 is a fragment of an advertisement) to break the tie between the identical magnitudes of the second and third cumulative offset values. In some implementations, primary content might always selected to break the tie.

In this example, the selected cumulative offset value is the second cumulative offset value, which corresponds to playing back all of S2 and dropping all of P2 (as indicated in FIG. 1C by the crossed out fragment P2). Because all of P2 is being dropped, there is a gap between the end of S2 and the beginning of P3. The dynamic offset value is updated to account for this gap. Specifically, the dynamic offset value of 0.9 seconds is adjusted by the duration of fragment P2 subtracted by the amount of overlap o2. In this example, the duration of fragment P2, labeled as d4, is 2 seconds. In other words, the dynamic offset value is updated to be 0.9+(0.9−2)=−0.2. For this example, it should be appreciated that when accounting for the positive or negative sign, the dynamic offset value is not being updated by the second cumulative offset value (e.g., +0.2) itself.

The presentation time data, such as a timestamp, for fragment P2 and subsequent fragments such as P3, are modified by the updated dynamic offset value. In this example, the timestamps for P2, P3, etc. are modified by a negative value (e.g., −0.2 seconds), which advances the presentation time earlier by 0.2 seconds. In a class of implementations, fragment S2 is loaded by device 106 into a playback buffer (e.g., a source buffer for video fragments) using presentation time data based on the dynamic offset value prior to update (e.g., +0.9 seconds), the dynamic offset value is updated to be −0.2, and the presentation time data for fragments P2 and subsequent fragments are adjusted by the updated dynamic offset value before or during loading into the playback buffer. As a result, during rendering, fragment S2 is played back for the entire duration of d3 seconds, fragment P2 is skipped completely, and the fragment P3 is played back starting after the end of S2. It should be noted that even though fragment P2 is loaded into the playback buffer, because the adjusted timestamp for the start of P2 is after the end of S2, the entire fragment P2 is dropped from playback by device 106. In some implementations, fragment P2 is dropped from playback by not being loaded into the playback buffer.

It should be appreciated that fragment P3, the fragment subsequent to the fragment having an overlap, is adjusted to be played back 0.2 seconds earlier relative to the media timeline indicated by the dynamic manifest data, which is the media timeline for device 102 for user A. As a result, user C is not confused and frustrated in the live chat since the goal alluded to by user A has already been rendered on device 106, unlike for device 104 for user B. It should be noted that even though device 102 and device 106 begin rendering fragment P3 with a difference of 0.2 seconds, the deviation is constrained within a limited time window. In other words, for device 106, as gaps and overlaps are encountered, corresponding durations of time are either subtracted from or added to the dynamic offset by which the time stamps of subsequent audio and video samples are adjusted, and fragments of either primary content or secondary content are dropped to minimize the deviation of the playhead latency from the playhead latency corresponding to the unmodified dynamic manifest data (e.g., the unmodified media timeline utilized by device 102).

In other words, device 106 modifies the media presentation timeline relative to the received dynamic manifest data to allow a device that is not configured to playback truncated fragments to maintain an acceptable window of variation in the playhead latency relative to, for example, a device that does support truncated fragments, such as device 102. Thus, the client-side logic on device 106 improves the media content playback experience not just for user C, but also for user A, since media presentation timelines for devices with different capabilities are coordinated for interactions such as social chat.

FIG. 2 illustrates an example of a computing environment in which a video content service 202 provides live streaming content via network 204 to a variety of client devices (206-1 through 206-5) in accordance with the techniques described herein. Content service 202 may conform to any of a wide variety of architectures such as, for example, a services platform deployed at one or more co-locations, each implemented with one or more servers 203. Network 204 represents any subset or combination of a wide variety of network environments including, for example, TCP/UDP over IP-based networks, unicast/multicast/broadcast networks, telecommunications networks, wireless networks, satellite networks, cable networks, public networks, private networks, wide area networks, local area networks, the Internet, the World Wide Web, intranets, extranets, and so on. Client devices 206 may be any suitable device capable of connecting to network 204 and consuming content provided by service 202. Such devices may include, for example, mobile devices (e.g., cell phones, smart phones, and tablets), personal computers (e.g., laptops and desktops), set top boxes (e.g., for cable, satellite, and online systems), smart televisions, digital assistant devices, gaming consoles, wearable computing devices (e.g., smart watches or smart glasses), etc.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling content service 202. Alternatively, such resources may be independent of content service 202, e.g., on a platform under control of a separate provider of computing resources with which content service 202 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

In the following examples and for the sake of simplicity, content service 202 is described as if it is integrated with the platform(s) that provides both the primary and secondary content to client devices. However, it will be understood that content service 202 may provide access to content in conjunction with one or more content delivery networks (e.g., CDN 214) that may or may not be independent of content service 202. In addition, the source(s) of one or both of the primary and secondary content may or may not be independent of content service 202 (e.g., as represented by content provider server 216, live content provider 218, and ad exchange 220). The range of variations known to those of skill in the art are contemplated to be within the scope of this disclosure.

The various implementations enabled by the present disclosure contemplate logic resident on the client devices consuming video content from content service 202; such logic being configured to handle overlaps between fragments of live streaming content as described herein. Such logic might be part of an existing algorithm or module on the client device or implemented to work in conjunction with such an algorithm or module.

It should also be noted that implementations are contemplated in which, in addition to content delivery logic 210

(which facilitates various aspects of content delivery to client devices 206), content service 202 may include other types of logic, e.g., logic 211 that facilitates dynamic ad insertion in live content. For example, such logic might be configured to dynamically combine manifest data associated with primary live content (e.g., received from live content provider 218) with manifest data associated with advertising content (e.g., received from ad exchange 220).

In addition to providing access to video content, content service 202 may also include a variety of information related to the video content (e.g., other associated metadata and manifests in data store 212 to which service 202 provides access). Alternatively, such information about the content, as well as the content itself may be provided and/or hosted by one or more separate platforms, e.g., CDN 214. It should be noted that, while logic 210 and 211, and data store 212 are shown as integrated with content service 202, implementations are contemplated in which some or all of these operate remotely from the associated content service, and/or are under the control of an independent entity. From these examples, those of skill in the art will understand the diversity of use cases to which the techniques described herein are applicable.

Figure 3:
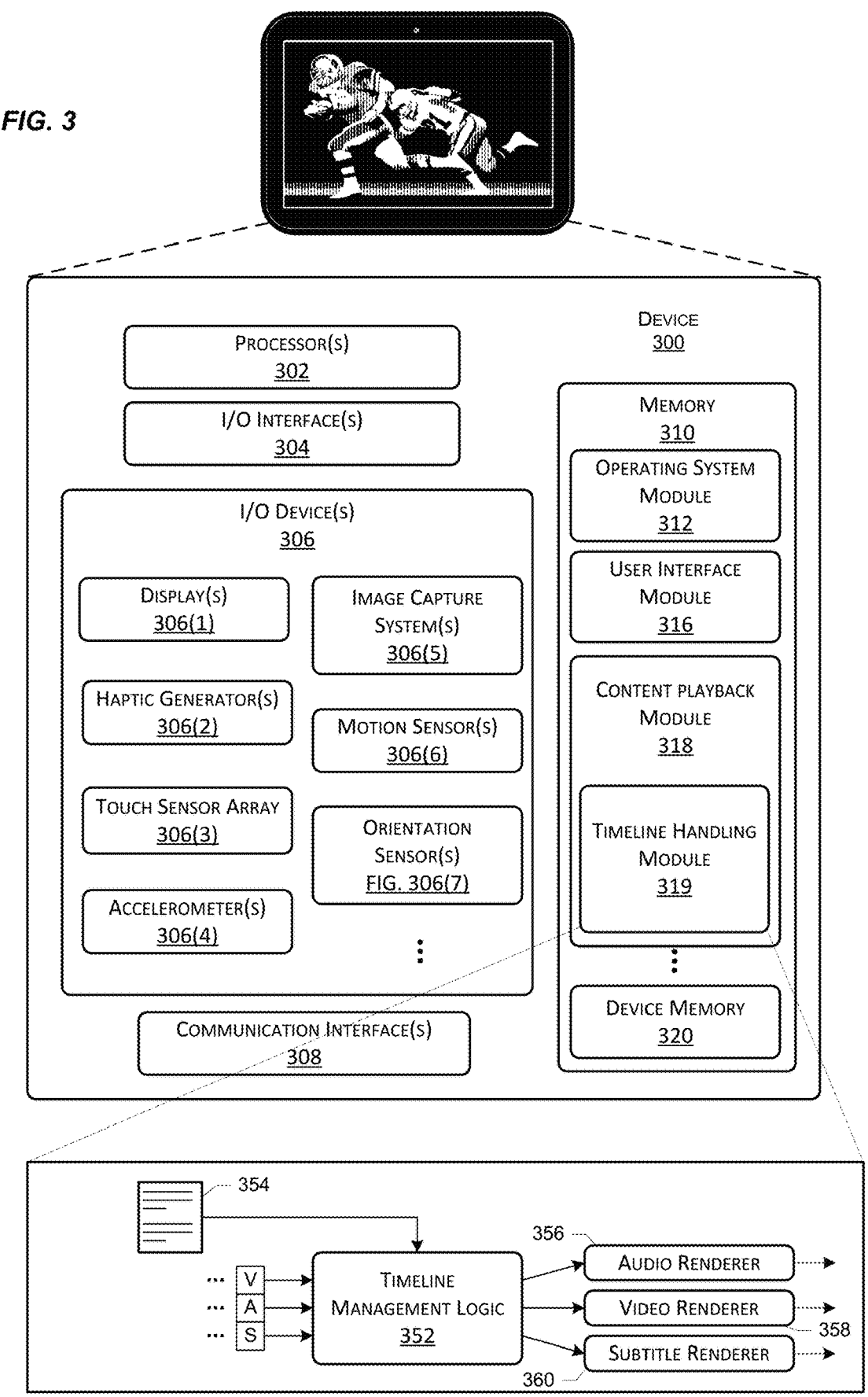
FIG. 3 is an example of a client device in which various implementations may be practiced.

A block diagram of an example of a client device 300 suitable for use with various implementations is shown in FIG. 3. As mentioned above, it should be understood that device 300 may be any of a wide variety of device types. Device 300 (depicted as a tablet device) includes one or more single or multi-core processors 302 configured to execute stored instructions (e.g., in device memory 320). Device 300 may also include one or more input/output (I/O) interface(s) 304 to allow the device to communicate with other devices. I/O interfaces 304 may include, for example, an inter-integrated circuit (I2C) interface, a serial peripheral interface (SPI) bus, a universal serial bus (USB), an RS-232 interface, a media device interface (e.g., an HDMI interface), and so forth. I/O interface(s) 304 is coupled to one or more I/O devices 306 which may or may not be integrated with client device 300.

Device 300 may also include one or more communication interfaces 308 configured to provide communications between the device and other devices. Such communication interface(s) 308 may be used to connect to cellular networks, personal area networks (PANs), local area networks (LANs), wide area networks (WANs), and so forth. For example, communications interfaces 308 may include radio frequency modules for a 3G or 4G cellular network, a WiFi LAN and a Bluetooth PAN. Device 300 also includes one or more buses or other internal communications hardware or software (not shown) that allow for the transfer of data and instructions between the various modules and components of the device.

Device 300 also includes one or more memories (e.g., memory 310). Memory 310 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 310 provides storage for computer readable instructions, data structures, program modules and other data for the operation of device 300. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 310 includes at least one operating system (OS) module 312 configured to manage hardware resources such as I/O interfaces 304 and provide various services to applications or modules executing on processor(s) 302. Memory 310 also includes a user interface module 316, a content playback module 318, and other modules. Memory 310 also includes device memory 320 to store a wide variety of instructions and information using any of a variety of formats including, for example, flat files, databases, linked lists, trees, or other data structures. Such information includes content for rendering and display on display 306(1) including, for example, any type of video content. In some implementations, a portion of device memory 320 may be distributed across one or more other devices including servers, network attached storage devices, and so forth.

The client side logic used for media timeline management for overlaps and/or gaps between fragments of streaming content (represented by 319 in FIG. 3) may be implemented in a variety of ways, e.g., in hardware, software, and/or firmware. For example, at least some of this functionality may be implemented as part of the code of a media player operating on device 300. Alternatively, module 319 may be implemented separately from and interact with the device's media player, web browser, mobile app, decoder, etc.

And as mentioned above, implementations are contemplated in which at least a portion of the logic or computer program instructions may reside on a separate platform, e.g., service 202, CDN 214, etc.; potentially working in conjunction with the client-side logic to manage the media timeline. Suitable variations and alternatives will be apparent to those of skill in the art. It will also be understood that device 300 of FIG. 3 is merely an example of a device with which various implementations enabled by the present disclosure may be practiced, and that a wide variety of other devices types may also be used (e.g., devices 206-1 to 206-5). The scope of this disclosure should therefore not be limited by reference to device-specific details.

Figure 4:
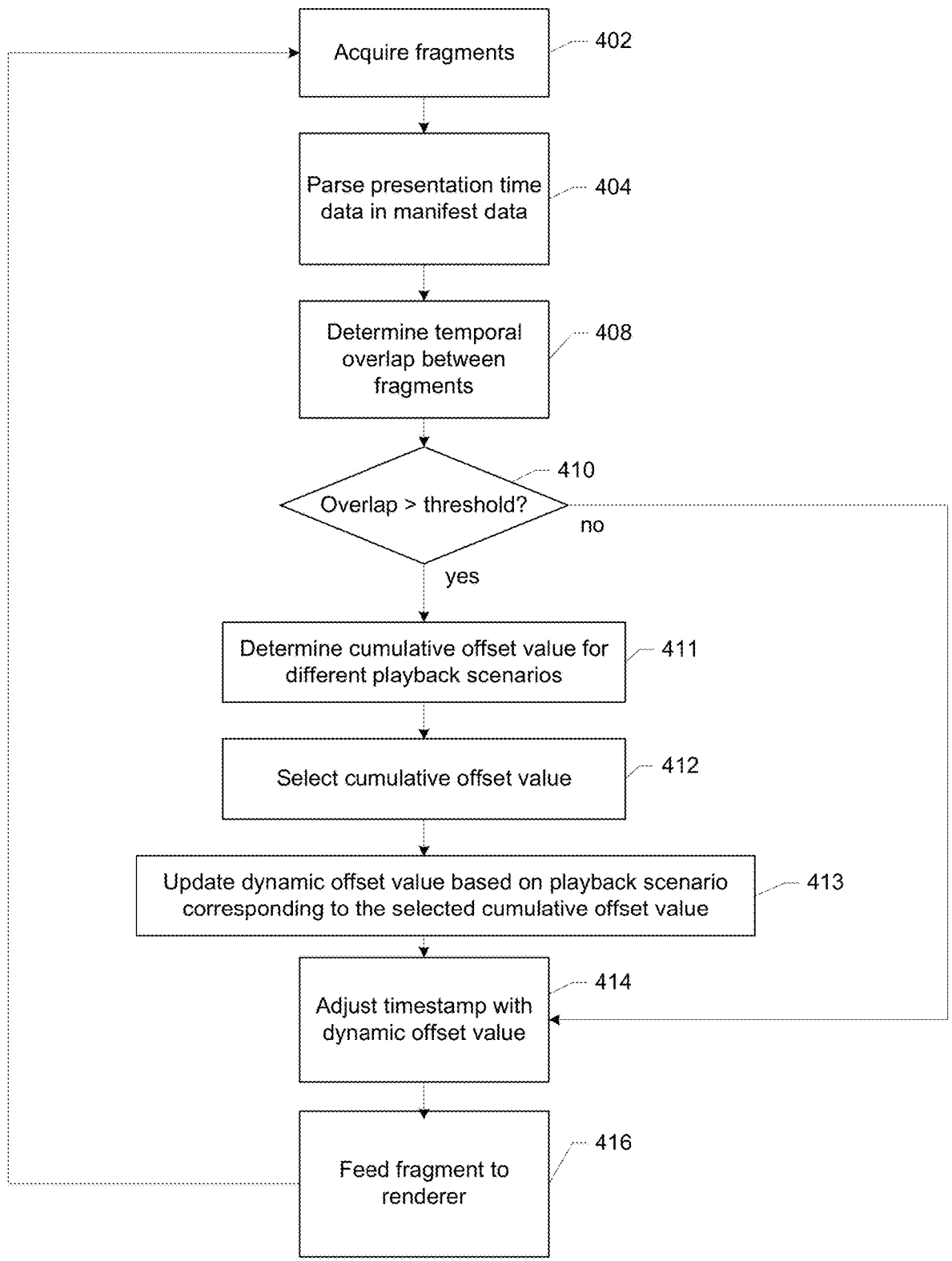
FIG. 4 is a flowchart illustrating operation of a particular class of implementations.

The delivery of live streaming content to a client device according to a particular implementation is illustrated in the flow chart of FIG. 4. This and other examples described herein assume the use of H.265 encoding (also commonly referred to as HEVC) for video content. However, it will be understood that the basic principles described herein may be employed with any of a variety of video and audio codecs including, for example, MPEG-1, MPEG-2, MPEG-4 Part 2, VC-1, H.263, VP8, VP9, Daala, and H.264. Moreover, the basic principles described herein may be employed with a wide variety of encoding parameters, such as, for example, constant or variable fragment duration, encoding formats with independently or non-independently decodable samples, integer or non-integer frame rates, and so forth. In some implementations, the primary content and secondary content may use different codecs and/or encoding parameters. The example illustrated in FIG. 4 also assumes a media player on the client device that includes logic (e.g., module 319) configured to manage at least some aspects of media timeline management. Again, these details are merely presented by way of example.

When a user wants to connect with a content service using a client device, the connection is typically achieved through some kind of login process to the service in a user interface presented on the client device. Content playback is provided, for example, via a resident media player, web browser, or mobile app. Access to content over the Internet is typically governed by a DRM system such as Google's Widevine, Microsoft's PlayReady, Apple's FairPlay, or Sony's OpenMG to name a few representative examples. Live streaming content is typically delivered in an encrypted stream using any of a variety of encryption technologies including, for example, various Advanced Encryption Standard (AES) and Elliptic Curve Cryptography (ECC) encryption techniques. The live stream may also be delivered using an adaptive bit rate streaming technique such as, for example, MPEG-DASH (Dynamic Adaptive Streaming over HTTP), Apple's HLS (HTTP Live Streaming), or Microsoft's Smooth Streaming, to name a few representative examples. It should be noted that the techniques described herein are compatible with a wide range of content services, media players, DRM systems, encryption technologies, and streaming technologies, the details of which are known to those of skill in the art. The nature and operation of these technologies will therefore not be described in detail to promote clarity.

The operation of a particular implementation is described with reference to the flowchart of FIG. 4. The video, audio, and subtitle fragments are requested and downloaded by the media player of the client using the dynamic manifest data (402). Timeline management logic (e.g., logic 352 of FIG. 3) in the media player parses the presentation time for the audio (A), video (V), and subtitle (S) fragments (404) in the dynamic manifest data. The presentation time data (modified as discussed below) and the associated fragments are eventually fed to their respective renderers, such as a separate source buffer for the audio, video, and subtitle streams.

In certain implementations, when parsing the presentation time data of the fragments, timeline management logic 352 of the media player compares the presentation time or start time of each fragment to the end time of the previous fragment to determine the amount of temporal overlap (408), e.g., as derived from the manifest data (e.g., manifest data 354 of FIG. 3). If there is an overlap of the two consecutive fragments larger than a certain threshold (410) timeline management logic 352 determines a cumulative offset value for a respective playback scenario (411). A suitable threshold may depend on a specific application. For example, in some contexts, small gaps or overlaps (e.g., on the order of milliseconds) may be safely ignored, while in others they may not. In some implementations, no threshold limitation is applied (i.e., the dynamic offset value is updated regardless of how small the overlap is).

As discussed previously for FIG. 1C, examples of playback scenarios include playing back both fragments that overlap in their entirety, playing back the earlier fragment completely and dropping the later fragment, or dropping the earlier fragment and playing back the later fragment completely. For each of these playback scenarios, a respective cumulative offset value is determined. In some implementations, the cumulative offset value is an absolute value (i.e., always a positive value). In various implementations, the cumulative offset value is a signed value (i.e., can be either positive or negative). In certain implementations, the cumulative offset value is the playhead delay for a particular playback scenario relative to the unmodified media timeline in manifest data 354.

It should be noted that the cumulative characteristic of the cumulative offset value is expressed by the dynamic offset value that is an input. Specifically, because the dynamic offset value is updated throughout content playback, such as at the transition from S1 to P1 illustrated in FIG. 1C, and the transition from S2 to P2, the dynamic offset value accounts for the accumulated effect of overlaps and/or gaps based on the playback history of the media content for the particular viewer device.

Timeline management logic 352 of the media player selects one cumulative offset value from the set of cumulative offset values (412). In some implementations, when the cumulative offset values are, for example, absolute values, the minimum value can be selected, as described in relation to FIG. 1C. In various implementations, the media player can select a cumulative offset value based on other constraints, such as, for example, being less than one half of the fragment duration (e.g., for constant fragment duration of two seconds exclude cumulative offset values greater than one second).

In some implementations, the media player can alternate dropping primary or secondary content to break ties (e.g., identical cumulative offset values for different playback scenarios), or refer to content analysis for breaking ties. For example, based on image, audio, or text analysis of closed captioning, if an event of high importance (e.g., football touchdown) is depicted in the primary content, secondary content may be dropped.

In certain implementations, when the cumulative offset values are, for example, signed values, the negative value furthest from zero (up to a maximum, such as one half the fragment duration) may be selected to minimize the playhead delay relative to a live spectator (e.g., to facilitate real-time sports wagering), rather than minimizing the playhead delay deviation from the unmodified manifest data media timeline. In various implementations, selection of the cumulative offset value may be a function of interactions with devices in local proximity. For example, a first media player having the timeline management logic 352 may detect a second media player without the equivalent of timeline management logic 352 playing identical media content in the same household (e.g., detecting different personal accounts with different device identifiers associated with the same family account, and IP addresses corresponding to the same local area network). In such scenarios, the first media player may select a cumulative offset value corresponding to always playing back both fragments, the playback scenario that is automatically employed by the second media player. Therefore, both the first and second media player have a similar presentation media timeline. It should be appreciated that the timeline management logic 352 may be adaptive. For example, if the second media player is turned off halfway through the media content, the first media player can begin selecting a cumulative offset value that minimizes the playhead delay deviation relative to the unmodified media timeline indicated in manifest data 354.

Based on the playback scenario represented by the selected cumulative offset value, timeline management logic 352 updates a dynamic offset value (413). The dynamic offset value represents the cumulative contributions of the overlaps up to that point in the media presentation. In some implementations, the dynamic offset value is initialized to 0 when the media content is first requested by the media player. In certain implementations, the dynamic offset value is also updated to account for the effects of media timeline gaps, re-buffering events, buffer flushing, and so forth.

In one example, the dynamic offset value is implemented in the framework of the MediaSource Extensions (MSE) API, which provides a set of media extensions for web browsers. Specifically, MSE offers an API that includes calls that can be used to implement gapless playback (e.g., play multiple tracks, such as audio, in sequence without introducing pauses on track change). For instance, the API provides configuring a "timestampOffset" of a "SourceBuffer." This attribute contains an offset that is applied to all access units of any newly-appended fragment. To implement gapless playback, this attribute is used to offset the fragments of the next period such that the earliest timestamp matches the end of the previous period. As another example, the dynamic offset value is implemented in the framework of the DASH standard, such as through the specification of a "presentationTimeOffset" or "PTO" that may be associated with a fragment of content. It should be appreciated that in some implementations, performing media timeline management using the dynamic offset value is based on both the "timestampOffset" and "presentationTimeOffset" parameters.

The timeline management logic adjusts the presentation time of each fragment of the audio, video, and subtitle components encountered from that point onwards (414). For example, these adjusted presentation times may be included as time stamps in the metadata associated with each sample. Each of the renderers (e.g., renderers 356, 358, and 360 of FIG. 3) are then fed their respective fragments with the adjusted presentation times (416).

It should be noted that, while the boundaries between primary content and secondary content are examples of the points at which discontinuities can arise, the scope of this disclosure is not so limited. That is, gaps or overlaps can occur between any two fragments of content including, for example, between two different fragments of secondary content (e.g., for consecutive ads in which the first ad has different durations of audio and video content). Gaps and overlaps can also occur between consecutive fragments within the same content. The present disclosure is therefore not limited to cases involving the insertion of secondary content. It should also be noted that, although specific implementations are described herein with reference to the presentation media timeline periods referenced in the DASH specification, the present disclosure is not so limited. Rather, any streaming technology in which gaps and overlaps between consecutive fragments of content can occur may benefit from the techniques described herein. Thus, at least some techniques enabled by the present disclosure can gracefully handle media timeline discontinuities in live streaming content, maintain audio/video synchronization, and maintain a desired timing between live and client playheads.

Referring again to FIG. 1A-C, it should be appreciated that the timing intervals depicted are not necessarily to scale. It should be noted that as described herein for FIGS. 1A-C, S1 and S2 are used to denote fragments of secondary content (e.g., dynamically inserted advertisement), P1-P3 are used to denote fragments of primary content (e.g., a professional football game), and the fragments may be any combination of audio or video fragments. The techniques disclosed herein are not limited to transitions from secondary to primary content, and can be applied to, for example, fragment overlaps in transitions from primary content, transitions between secondary content (e.g., from different ad exchange servers), and/or transitions between primary content (e.g., from studio commentators to footage of playing field). It should further be appreciated that the disclosed techniques are compatible with fragment durations that are constant (e.g., always two seconds, or always one second, etc.), or fragment durations that are variable (e.g., can range from 1 to 2 seconds, etc.). It should also be appreciated that overlap durations can be different (e.g., for FIGS. 1A-C, of can be 0.9 seconds, o2 can be 0.2 seconds, etc.).

Furthermore, it should be noted that the labeling of S1, S2, P1-P3 are for clarity purposes only, without implying the need for S1 or P1 to be the first fragment, S2 or P2 to be the second fragment, and so on in the manifest data. It should also be noted that an arbitrary number of fragments, though not illustrated in FIGS. 1A-C, may be present between, for example, S1 and S2, P1 and P2, and so on, and an arbitrary number of occurrences of fragment overlaps may occur between the two occurrences S1-P1 and S2-P2 that are illustrated in FIGS. 1A-C.

Because of differences between audio and video encoding techniques, corresponding portions of content are not necessarily identical in length. For example, there may be different ending and starting points of video fragment V1 and audio fragment A1 associated with S1, and video fragment V2 and audio fragment A2 associated with P1, respectively. It should be appreciated that the techniques disclosed herein for playhead latency management are compatible with various techniques for audio and video synchronization (e.g., different dynamic offset values can be individually tracked for audio, video, and/or other components such as subtitles).

It should be noted that while the examples disclosed herein are presented in the context of modifying presentation time data for fragments of media content, the disclosed techniques are applicable to modifying presentation time data at different granularities of media content. For example, presentation time data can be modified at the period level, at the scene level, at the chapter level, at the video/audio frame level, at the bit sample level, at the segment level, at the group of pictures level, and so forth.

It should also be noted that while the examples disclosed herein are presented in the context of live streaming media content, the disclosed techniques are applicable to other types of media content, such as video on demand (VOD) style media content. As one example, the media content can be just-after-broadcast (JAB) media content, which is media content that can be requested on demand, such as in near real-time relative to the start of the ongoing live event. In a certain class of implementations, user configurations, and/or content delivery service policies, and/or configurations of nearby devices streaming the same content can modify the media timeline management actions performed by a particular client device. In one example, devices that initiate streaming of JAB content within a time window relative to the beginning time of the corresponding live stream, such as 5 minutes, may be directed by the origin server to implement media timeline management override logic that preferentially decreases playhead delay (e.g., always updates the dynamic offset value based on the playback scenario corresponding to dropping an entire fragment that overlaps with another fragment) until the playhead delay between the device streaming JAB content and the live stream is within a threshold. For various implementations, the disclosed techniques for media timeline management for overlapping fragments can be implemented in parallel with other mechanisms for playhead control (e.g., dropping of image frames labeled as less important, accelerating playback without degrading the visual experience), such that the aggregate effects of dropping a fragment that overlaps with another fragment, dropping specific image frames, and imperceptible playback acceleration, provide a scalable degree of playhead control. In some implementations, devices initiating streaming of JAB content outside the time window may perform media timeline management based on the same constraints as discussed for FIG. 1C (e.g., media timeline management without preferentially dropping a fragment with an overlap), or may bypass media timeline management altogether, effectively resulting in the mode of operation depicted in FIG. 1B. It should further be appreciated that in various implementations, no time window relative to the live streaming content is considered. For example, if the live event is 2 hours long, and the JAB content is not made available until after the live event has ended, the JAB content already starts 2 hours away from the original live event, and therefore the media timeline logic does not consider timing differences from the original live event. It should also be appreciated that the range of implementations described above are applicable to the scenario of live streaming content that has been paused. For example, media timeline management logic after resuming from a pause duration of three minutes may result in different updates for the dynamic offset value in comparison to resuming from a pause duration of 10 minutes. For instance, after resuming from a pause duration of three minutes, a device may have the option to implement the media timeline management logic described with reference to FIG. 1C, such that playback scenarios for overlaps/gaps are selected to reduce the playhead delay deviation relative to the original media timeline (with reference to FIG. 1A). On the other hand, after resuming from a pause duration of 10 minutes, a device may have the option to implement the media timeline management logic described with reference to FIG. 1B, where the cumulative playhead delay is not constrained relative to the original media timeline.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computing device, comprising:
   memory; and
   one or more processors configured to:
      request fragments of a media presentation using dynamic manifest data, the media presentation including time periods of live event content alternating with time periods of advertising content, the live event content and the advertising content originating from different content providers, the dynamic manifest data including presentation time data indicating a media timeline associated with the media presentation;
      determine that the dynamic manifest data includes presentation time data indicating a duration for a temporal overlap based on an end time for a final video fragment of advertising content in a first time period of the media presentation being later than a start time for a beginning video fragment of live event content in a second time period of the media presentation;
      determine a plurality of cumulative offset values, each cumulative offset value representing a corresponding playback scenario for transitioning from the first time period to the second time period, each playback scenario characterized by a corresponding increase or decrease in a timing difference between a live playhead and a client playhead, wherein the one or more processors are configured to determine the plurality of cumulative offset values by:
         calculating a first cumulative offset value representing playing back the final video fragment entirely and playing back the beginning video fragment entirely, the first cumulative offset value being the absolute value of a sum of a dynamic offset value and the duration of the temporal overlap; and
         calculating a second cumulative offset value representing dropping from playback the final video fragment entirely or the beginning video fragment entirely, the second cumulative offset value being the absolute value of a sum of the dynamic offset value and the duration of the temporal overlap minus the duration of a dropped fragment for the second cumulative offset value;
      select a cumulative offset value from among the plurality of cumulative offset values, the selected cumulative offset value corresponding to a playback scenario that minimizes a positive or negative deviation of the timing difference between the live playhead and the client playhead relative to the media timeline indicated in the dynamic manifest data;
      update the dynamic offset value based on a presentation timeline for playback of the media presentation according to the playback scenario corresponding to the selected cumulative offset value, wherein updating the dynamic offset value includes adding the duration of the temporal overlap if the selected cumulative offset value corresponds to the first cumulative offset value, or adding the duration of the temporal overlap minus the duration of the dropped fragment if the selected cumulative offset value corresponds to the second cumulative offset value;
      adjust, based on the dynamic offset value, presentation time data for video fragments, audio fragments, and subtitle fragments subsequent to the beginning video fragment associated with the second time period of the media presentation; and
      append the video fragments, audio fragments, and subtitle fragments subsequent to the beginning video fragment in respective source buffers based on the adjusted presentation time data.

2. The computing device of claim 1, wherein the fragments of the media presentation have a variable duration, and wherein determining the plurality of cumulative offset values further includes:
   calculating a third cumulative offset value representing dropping from playback one of the last video fragment or the beginning video fragment that was not dropped in determining the second cumulative offset value, the third cumulative offset value being the absolute value of a sum of the dynamic offset value and the duration of the temporal overlap minus the duration of a dropped fragment for the third cumulative offset value.

3. The computing device of claim 1, wherein minimizing the positive or negative deviation corresponds to selecting a smallest absolute value in the plurality of cumulative offset values.

4. The computing device of claim 3, wherein the one or more processors are further configured to: use an audio renderer using audio samples that are not independently decodable, and/or a video renderer that is configured to play back an entire video fragment that is decoded.

5. A computing device, comprising:
memory; and
one or more processors configured to:
request fragments of media content using manifest data, the manifest data including presentation time data indicating a temporal overlap for a first fragment in a first time period of the media content and a second fragment in a second time period of the media content;
determine a plurality of cumulative offset values, each cumulative offset value representing a corresponding playback scenario characterized by a corresponding difference between a live playhead and a client playhead, wherein the one or more processors are configured to determine the plurality of cumulative offset values by:
calculating a first cumulative offset value representing playing back the first fragment entirely and playing back the second fragment entirely, the first cumulative offset value being the absolute value of a sum of the dynamic offset value and a duration of the temporal overlap; and
calculating a second cumulative offset value representing dropping from playback the first fragment entirely or the second fragment entirely, the second cumulative offset value being the absolute value of a sum of the dynamic offset value and the duration of the temporal overlap minus a duration of a dropped fragment for the second cumulative offset value;
select a cumulative offset value from among the plurality of cumulative offset values, the selected cumulative offset value corresponding to a playback scenario that conforms to a constraint for a delay between the live playhead and the client playhead;
update a dynamic offset value based on a presentation timeline for playback of the media content according to the playback scenario corresponding to the selected cumulative offset value;
adjust presentation time data for at least one fragment associated with the second time period of the media content based on the dynamic offset value; and
render the at least one fragment of the second time period of the media content based on the adjusted presentation time data.

6. The computing device of claim 5, wherein the fragments of the media content have a variable duration, and wherein the one or more processors are further configured to determine the plurality of cumulative offset values by:
calculating a third cumulative offset value representing dropping from playback one of the first fragment entirely or the second fragment entirely that was not dropped in determining the second cumulative offset value, the third cumulative offset value being the absolute value of a sum of the dynamic offset value and the duration of the temporal overlap minus a duration of a dropped fragment for the third cumulative offset value.

7. The computing device of claim 5, wherein the one or more processors are further configured to select the cumulative offset value by conforming to a constraint of being a smallest absolute value in the plurality of cumulative offset values.

8. The computing device of claim 7, wherein the one or more processors are further configured to select the cumulative offset value by conforming to a constraint of being no more than half of a duration for a fragment of the media content.

9. The computing device of claim 5, wherein the one or more processors are further configured to update the dynamic offset value by adding the duration of the temporal overlap if the selected cumulative offset value corresponds to the first cumulative offset value, or adding the duration of the temporal overlap minus the duration of the dropped fragment if the selected cumulative offset value corresponds to the second cumulative offset value.

10. The computing device of claim 5, wherein the one or more processors are further configured to adjust the presentation time data for the at least one fragment includes using the dynamic offset value to advance or delay a timestamp for the at least one fragment.

11. The computing device of claim 5, wherein the one or more processors are further configured to: use an audio renderer using audio samples that are not independently decodable, and/or a video renderer that is configured to play back an entire video fragment that is decoded.

12. The computing device of claim 5, wherein the one or more processors are further configured to select the cumulative offset value also by determining a media timeline management capability of a second computing device requesting fragments of the media content.

13. A method comprising:
requesting fragments of media content using manifest data, the manifest data including presentation time data indicating a temporal overlap for a first fragment in a first time period of the media content and a second fragment in a second time period of the media content;
determining a plurality of cumulative offset values, each cumulative offset value representing a corresponding playback scenario characterized by a corresponding difference between a live playhead and a client playhead, wherein determining the plurality of cumulative offset values further includes:
calculating a first cumulative offset value representing playing back the first fragment entirely and playing back the second fragment entirely, the first cumulative offset value being the absolute value of a sum of the dynamic offset value and a duration of the temporal overlap; and
calculating a second cumulative offset value representing dropping from playback the first fragment entirely or the second fragment entirely, the second cumulative offset value being the absolute value of a sum of the dynamic offset value and the duration of the temporal overlap minus the duration of a dropped fragment for the second cumulative offset value;
selecting a cumulative offset value from among the plurality of cumulative offset values, the selected cumulative offset value corresponding to a playback scenario that conforms to a constraint for a delay between the live playhead and the client playhead;
updating a dynamic offset value based on a presentation timeline for playback of the media content according to the playback scenario corresponding to the selected cumulative offset value;
adjusting presentation time data for at least one fragment associated with the second time period of the media content based on the dynamic offset value; and rendering the at least one fragment of the second time period of the media content based on the adjusted presentation time data.

14. The method of claim 13, wherein the fragments of the media content have a variable duration, and wherein determining the plurality of cumulative offset values further includes:

calculating a third cumulative offset value representing dropping from playback one of the first fragment entirely or the second fragment entirely that was not dropped in determining the second cumulative offset value, the third cumulative offset value being the absolute value of a sum of the dynamic offset value and the duration of the temporal overlap minus the duration of a dropped fragment for the third cumulative offset value.

15. The method of claim 13, wherein selecting the cumulative offset value further includes conforming to a constraint of being a smallest absolute value in the plurality of cumulative offset values.

16. The method of claim 15, wherein selecting the cumulative offset value further includes conforming to a constraint of being no more than half of a duration for a fragment of the media content.

17. The method of claim 13, wherein updating the dynamic offset value further includes adding the duration of the temporal overlap if the selected cumulative offset value corresponds to the first cumulative offset value, or adding the duration of the temporal overlap minus the duration of the dropped fragment if the selected cumulative offset value corresponds to the second cumulative offset value.

18. The method of claim 13, wherein adjusting the presentation time data for the at least one fragment further includes using the dynamic offset value to advance or delay a timestamp for the at least one fragment.

19. The method of claim 13, wherein selecting the cumulative offset value further includes determining a media timeline management capability of a second computing device requesting fragments of the media content.

* * * * *